(12) United States Patent
Velasco Sarasola

(10) Patent No.: US 10,581,905 B2
(45) Date of Patent: Mar. 3, 2020

(54) DETECTION OF MANIPULATION OF APPLICATIONS

(71) Applicant: HDIV SECURITY S.L., San Sebastian, Guipuzcoa (ES)

(72) Inventor: Roberto Velasco Sarasola, Andoain (ES)

(73) Assignee: HDIV SECURITY, S.L., Guipúzcoa (ES)

( * ) Notice: Subject to any disclaimer, the term of this patent is extended or adjusted under 35 U.S.C. 154(b) by 0 days.

(21) Appl. No.: 15/303,399

(22) PCT Filed: Mar. 27, 2015

(86) PCT No.: PCT/EP2015/056695
§ 371 (c)(1),
(2) Date: Oct. 11, 2016

(87) PCT Pub. No.: WO2015/155028
PCT Pub. Date: Oct. 15, 2015

(65) Prior Publication Data
US 2017/0041340 A1    Feb. 9, 2017

(30) Foreign Application Priority Data
Apr. 11, 2014    (EP) .................................... 14382140

(51) Int. Cl.
*H04L 29/06*    (2006.01)
*H04L 29/08*    (2006.01)

(52) U.S. Cl.
CPC .......... *H04L 63/1466* (2013.01); *H04L 63/02* (2013.01); *H04L 63/1433* (2013.01); *H04L 63/168* (2013.01); *H04L 67/02* (2013.01)

(58) Field of Classification Search
CPC . H04L 63/1466; H04L 67/02; H04L 63/1433; H04L 63/02; H04L 63/168
See application file for complete search history.

(56) References Cited

U.S. PATENT DOCUMENTS

| | | | | |
|---|---|---|---|---|
| 6,112,319 A | * | 8/2000 | Paulson | ................ G06F 11/073 710/54 |
| 7,472,413 B1 | * | 12/2008 | Mowshowitz | ...... H04L 63/1408 726/10 |

(Continued)

OTHER PUBLICATIONS

Javier Ochoa, Security for Java Web Applications Using Apache Shiro, Helsinki University, Nov. 2014.*

(Continued)

*Primary Examiner* — David Garcia Cervetti
(74) *Attorney, Agent, or Firm* — Reising Ethington, P.C.

(57) ABSTRACT

The present invention relates to a solution to improve the security of applications. Particularly, the invention relates to the control of the whole lifecycle of data traffic between a client and a server applying also internal data flow system within the server only for editable data. The invention presents a method for detection of manipulation of data (29) by a client (11, 15, 25) that performs a request to a server (13, 17, 27) and detection of vulnerabilities within source code. The invention also presents an application and a system for the detection of manipulation in applications. As a particular example, the invention presents a method for detection of manipulation of web pages in HTTP.

22 Claims, 7 Drawing Sheets

(56) References Cited

U.S. PATENT DOCUMENTS

| | | | |
|---|---|---|---|
| 7,788,235 B1* | 8/2010 | Yeo | G06F 21/606 707/687 |
| 7,870,610 B1* | 1/2011 | Mitchell | G06F 21/53 726/22 |
| 8,006,140 B2* | 8/2011 | Khanna | G06F 11/0709 714/45 |
| 8,627,465 B2* | 1/2014 | Guy | G06F 21/577 726/22 |
| 8,640,216 B2* | 1/2014 | Anderson | G06F 21/64 713/151 |
| 8,646,088 B2* | 2/2014 | Pistoia | H04L 63/1441 726/22 |
| 8,904,543 B2* | 12/2014 | Guarnieri | G06F 21/562 726/25 |
| 9,158,923 B2* | 10/2015 | Guarnieri | G06F 21/52 |
| 9,191,285 B1* | 11/2015 | Isaacson | H04L 41/5009 |
| 9,292,693 B2* | 3/2016 | Tripp | G06F 21/12 |
| 9,454,659 B1* | 9/2016 | Daymont | G06F 21/566 |
| 9,471,533 B1* | 10/2016 | Roth | G06F 15/167 |
| 9,489,515 B2* | 11/2016 | Yermakov | H04L 63/0227 |
| 9,507,943 B1* | 11/2016 | Allen | G06F 21/577 |
| 9,639,703 B2* | 5/2017 | Liu | G06F 21/577 |
| 9,882,923 B2* | 1/2018 | Molnar | G06F 21/54 |
| 2002/0091991 A1* | 7/2002 | Castro | G06F 9/06 717/106 |
| 2003/0098893 A1* | 5/2003 | Makinen | G06F 16/9038 715/853 |
| 2003/0195861 A1* | 10/2003 | McClure | H04L 41/12 |
| 2003/0217039 A1* | 11/2003 | Kurtz | G02B 5/3083 |
| 2004/0015728 A1* | 1/2004 | Cole | G02B 5/3083 726/23 |
| 2004/0078384 A1* | 4/2004 | Keir | G02B 5/3083 |
| 2005/0055480 A1* | 3/2005 | Jeppsen | G06F 3/0661 710/33 |
| 2005/0060553 A1* | 3/2005 | Allen | H04L 63/0428 713/182 |
| 2005/0216582 A1* | 9/2005 | Toomey | G06F 21/41 709/224 |
| 2005/0229239 A1* | 10/2005 | Gray | G06F 21/41 726/4 |
| 2005/0273854 A1* | 12/2005 | Chess | G06F 21/577 726/22 |
| 2006/0123167 A1* | 6/2006 | Jeppsen | G06F 3/061 710/106 |
| 2006/0271917 A1* | 11/2006 | Das | G06F 8/31 717/130 |
| 2006/0277604 A1* | 12/2006 | Pandit | G06F 21/52 726/22 |
| 2007/0011319 A1* | 1/2007 | McClure | G02B 6/105 709/224 |
| 2007/0143629 A1* | 6/2007 | Hardjono | H04L 63/0823 713/189 |
| 2007/0157156 A1* | 7/2007 | Meier | G06F 8/10 717/101 |
| 2007/0240138 A1* | 10/2007 | Chess | G06F 11/3612 717/143 |
| 2008/0168471 A1* | 7/2008 | Benner | H04L 49/90 719/314 |
| 2008/0184208 A1* | 7/2008 | Sreedhar | G06F 21/577 717/128 |
| 2008/0295178 A1* | 11/2008 | Beresniewicz | G06F 21/554 726/25 |
| 2009/0125429 A1* | 5/2009 | Takayama | G06Q 20/04 705/35 |
| 2009/0138937 A1* | 5/2009 | Erlingsson | H04L 63/1416 726/1 |
| 2010/0027429 A1* | 2/2010 | Jorgens | H04L 43/50 370/250 |
| 2010/0027536 A1* | 2/2010 | Jorgens | H04L 69/16 370/389 |
| 2010/0037317 A1* | 2/2010 | Oh | G06F 21/554 726/23 |
| 2010/0050263 A1* | 2/2010 | Weisman | G06F 21/577 726/25 |
| 2010/0083240 A1* | 4/2010 | Siman | G06F 8/433 717/144 |
| 2010/0131721 A1* | 5/2010 | Title | G06F 21/51 711/154 |
| 2010/0180193 A1* | 7/2010 | Jagdale | G06F 16/958 715/234 |
| 2010/0293616 A1* | 11/2010 | Young | G06F 21/564 726/25 |
| 2011/0016456 A1* | 1/2011 | Artzi | G06F 11/3684 717/131 |
| 2011/0016457 A1* | 1/2011 | Artzi | G06F 11/3684 717/131 |
| 2011/0030061 A1* | 2/2011 | Artzi | G06F 11/3604 726/25 |
| 2011/0154473 A1 | 6/2011 | Anderson et al. | |
| 2011/0162072 A1* | 6/2011 | Hay | G06F 21/577 726/25 |
| 2011/0185271 A1* | 7/2011 | Aciicmez | G06F 21/563 715/234 |
| 2011/0185427 A1* | 7/2011 | Aciicmez | G06F 21/53 726/24 |
| 2011/0252475 A1* | 10/2011 | Mui | G06F 21/56 726/23 |
| 2011/0283110 A1* | 11/2011 | Dapkus | G06F 21/577 713/182 |
| 2011/0302566 A1* | 12/2011 | Abadi | G06F 21/577 717/168 |
| 2011/0307951 A1* | 12/2011 | Yermakov | H04L 63/0227 726/12 |
| 2012/0017117 A1* | 1/2012 | Ghosh | G06F 11/3608 714/26 |
| 2012/0017119 A1* | 1/2012 | Ghosh | G06F 11/3684 714/38.1 |
| 2012/0017200 A1* | 1/2012 | Ghosh | G06F 11/3684 717/126 |
| 2012/0023377 A1* | 1/2012 | Garskof | G06F 21/44 714/48 |
| 2012/0023394 A1* | 1/2012 | Pieczul | G06F 21/50 715/234 |
| 2012/0023395 A1* | 1/2012 | Pieczul | G06F 21/51 715/234 |
| 2012/0131670 A1* | 5/2012 | Artzi | G06F 21/00 726/22 |
| 2012/0174229 A1* | 7/2012 | Pistoia | G06F 21/554 726/25 |
| 2012/0192280 A1* | 7/2012 | Venkatakrishnan | G06F 21/6227 726/25 |
| 2012/0260344 A1* | 10/2012 | Maor | G06F 11/3688 726/25 |
| 2012/0266247 A1* | 10/2012 | Guy | G06F 21/577 726/25 |
| 2012/0311713 A1* | 12/2012 | Amit | G06F 21/563 726/25 |
| 2012/0311714 A1* | 12/2012 | Amit | G06F 21/577 726/25 |
| 2013/0007887 A1* | 1/2013 | Haviv | G06F 21/577 726/25 |
| 2013/0019314 A1* | 1/2013 | Ji | H04L 67/02 726/25 |
| 2013/0024937 A1* | 1/2013 | Glew | G06F 21/577 726/23 |
| 2013/0024939 A1* | 1/2013 | Glew | G06F 21/577 726/24 |
| 2013/0081134 A1* | 3/2013 | Glew | G06F 21/552 726/22 |
| 2013/0086688 A1* | 4/2013 | Patel | G06F 21/53 726/25 |
| 2013/0091578 A1* | 4/2013 | Bisht | G06F 21/53 726/25 |
| 2013/0139262 A1* | 5/2013 | Glew | H04L 63/1466 726/23 |
| 2013/0139267 A1* | 5/2013 | Amit | H04L 63/1433 726/25 |

(56) References Cited

U.S. PATENT DOCUMENTS

| | | | |
|---|---|---|---|
| 2013/0160132 A1* | 6/2013 | Genova | H04L 63/126 726/26 |
| 2013/0179863 A1* | 7/2013 | Vangala | G06F 8/74 717/124 |
| 2014/0047538 A1* | 2/2014 | Scott | G06F 11/3604 726/22 |
| 2014/0068563 A1* | 3/2014 | Saltzman | G06F 11/3612 717/124 |
| 2014/0096257 A1* | 4/2014 | Chou | G06F 21/577 726/25 |
| 2014/0130158 A1* | 5/2014 | Wang | G06F 21/566 726/23 |
| 2014/0173571 A1* | 6/2014 | Gluck | G06F 11/3636 717/130 |
| 2014/0173741 A1* | 6/2014 | Gluck | G06F 21/54 726/25 |
| 2014/0173742 A1* | 6/2014 | Gluck | G06F 21/577 726/25 |
| 2014/0173743 A1* | 6/2014 | Gluck | G06F 21/54 726/25 |
| 2014/0237604 A1* | 8/2014 | Guarnieri | G06F 21/577 726/25 |
| 2014/0282424 A1* | 9/2014 | Sheridan | G06F 11/3604 717/127 |
| 2014/0283068 A1* | 9/2014 | Call | H04L 63/1425 726/23 |
| 2014/0283081 A1* | 9/2014 | Sheridan | G06F 21/577 726/25 |
| 2014/0359776 A1* | 12/2014 | Liu | G06F 21/577 726/25 |
| 2015/0106943 A1* | 4/2015 | Tripp | H04L 63/1483 726/26 |
| 2015/0121532 A1* | 4/2015 | Barel | G06F 21/577 726/25 |
| 2015/0121533 A1* | 4/2015 | Gluck | G06F 21/577 726/25 |
| 2015/0143502 A1* | 5/2015 | Peterson | H04L 63/0245 726/11 |
| 2015/0156209 A1* | 6/2015 | Heart | H04L 63/083 726/23 |
| 2015/0215333 A1* | 7/2015 | Kojima | H04L 12/6418 726/25 |
| 2015/0264082 A1* | 9/2015 | Belva | H04L 63/1466 726/25 |
| 2015/0288705 A1* | 10/2015 | Ligman | H04L 63/1433 726/1 |
| 2015/0304337 A1* | 10/2015 | Nguyen-Tuong | G06F 21/51 726/1 |
| 2016/0110549 A1* | 4/2016 | Schmitt | G06F 21/577 726/25 |
| 2016/0140345 A1* | 5/2016 | Kojima | G06F 21/577 726/25 |
| 2016/0314301 A1* | 10/2016 | Johns | G06F 21/577 |
| 2017/0017789 A1* | 1/2017 | Daymont | G06F 21/556 |
| 2017/0195361 A1* | 7/2017 | Liu | G06F 21/577 |
| 2017/0351596 A1* | 12/2017 | Sheridan | G06F 11/3604 |
| 2018/0316715 A1* | 11/2018 | Liu | G06F 8/42 |
| 2019/0243971 A1* | 8/2019 | Call | H04L 63/1416 |

OTHER PUBLICATIONS

HDIV, HDIV HTTP Data Integrity Validator: Protect your Web Applications against Attacks, 2011.*

Chan, Chiung-Wan, and Chung-Huang Yang. Design and Implementation of Open Source Web Apllication Security Tool., JWIS 2009.*

U. Kargen and N. Shahmehri. InputTracer: A Data-Flow Analysis Tool for Manual Program Comprehension of x86 Binaries. In Proc. of SCAM 2012, pp. 138-143. IEEE, 2012.*

Vivek Haldar, Deepak Chandra, and Michael Franz. Dynamic taint propagation for Java. In Proceedings of the 21st Annual Computer Security Applications Conference (ACSAC'05). 303-311. 2005.*

Andrei Rimsa , Marcelo D'amorim , Fernando Magno Quintão Pereira , Roberto S. Bigonha, Efficient static checker for tainted variable attacks, Science of Computer Programming, 80, p. 91-105, Feb. 2014 [doi>10.1016/j.scico.2013.03.012].*

Robert Velasco et al.: "Are Java Web Applications Secure?" Jun. 21, 2012; 18 pages.

Holger Junker: "OWASP Enterprise Security API ; Der Werkzeugkasten far sichere Webanwendungen", Datenschutz Und Datensicherheit, Vieweg Und Teubner Verlag, DE, vol. 36, No. 11, Oct. 23, 2012, ISSN: 1862-2607, DOI: 10.1007/511623-012-0275-3; pp. 801-804.

English translation of Abstract of Junker, H. Data Protection Data (2012) 26: 801 DOI: 10.1007/511623-012-0275-3; 1 page.

International Search Report dated Jun. 8, 2015 for PCT/EP2015/056995, 3 pages.

European Search Report and Annex to the European Search Report dated Sep. 25, 2014 for the priority European Patent Application No. EP 14 38 2140; 2 pages.

* cited by examiner

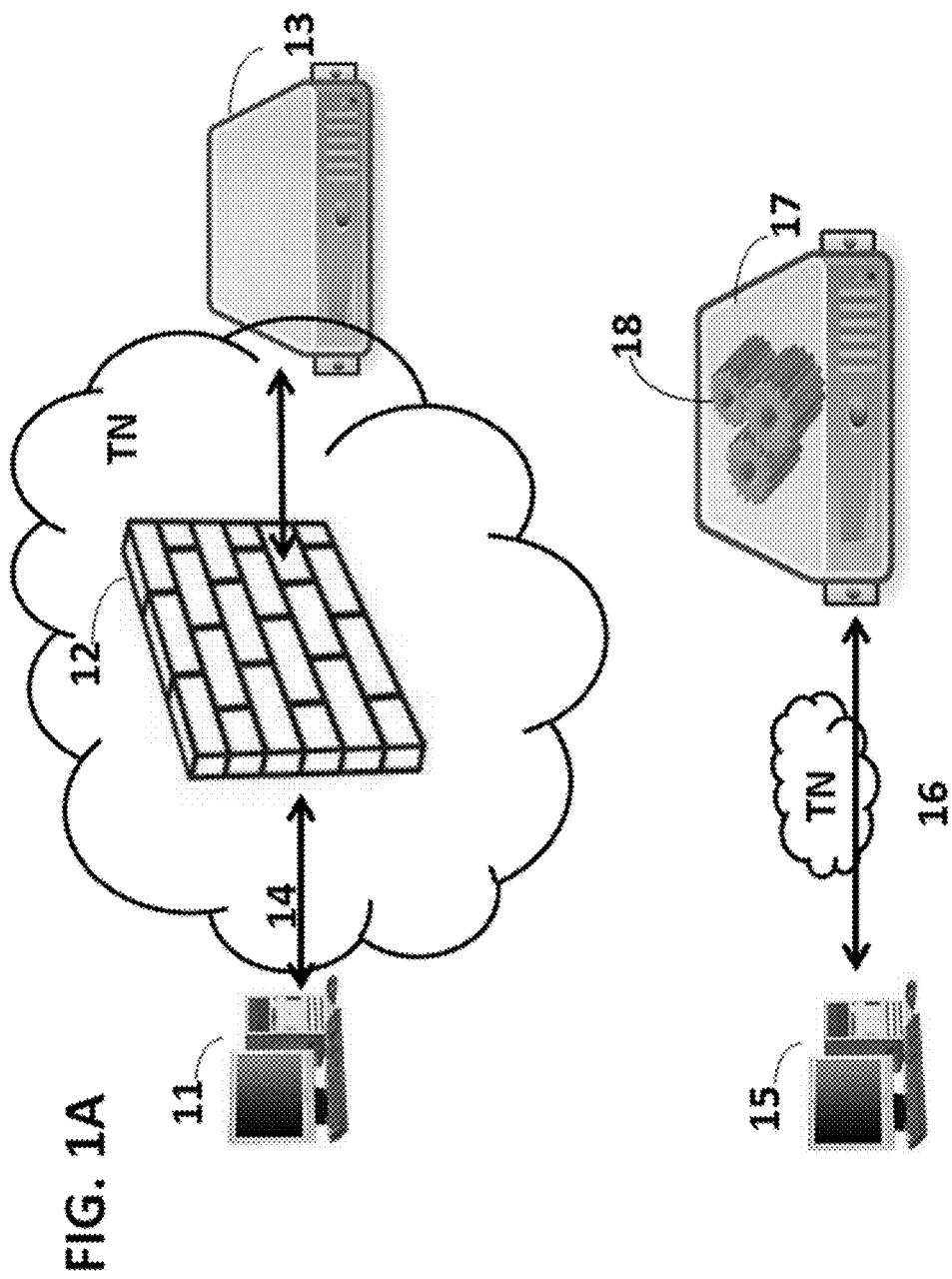

DETECTION OF MANIPULATION OF APPLICATIONS

TECHNICAL FIELD OF THE INVENTION

The present invention relates to a solution to improve the security of interactions between a server and a client in client-server applications. Particularly, the invention relates to the control of the whole lifecycle of data traffic between a client and a server applying also internal data flow system within the server only for editable data.

BACKGROUND OF THE INVENTION

In many kind of applications is necessary the information exchange between the client and the server side of the application, using usually some of the following security features:

Authentication with a user name and its associated password or a digital certificate, Cyphering the communication between the server and the client, using the protocol Secure Sockets Layer (SSL), However, even when the authentication process and the SSL (secure communications) are used, or even when the application source code is signed, it does not guaranty the integrity of the information that the client sends to the server. In other words, the client side it's the owner of the machine used by the client and it's possible the manipulation of the information existing in that machine (within memory, within files, etc.).

For example, in a web application, the client uses the web application or page to make a web request, with said application the client can modify the web request changing the contract between the server and the client, said modifications could be for example:

Modifying received parameters of the web page received from the server.

Adding new parameters in the web page.

Modifying the uniform resource locators (URL) of the web page received from the server.

Adding new URL to the web page received from the server (Performing requests on URL not received from the server).

Modifying or adding cookies to the request.

Modifying or Adding headers in the web page.

In other words, the HTTP protocol allows making modifications at the client side so as modify all the data which are sent to the server, changing the original contract (GUI or API interactions) provided by the server. In addition, the client can try different type of attacks using legal input text fields, such as textbox fields within a form.

For this reason, the requests received in the server must be validated because the reliability and the integrity of the received data are not always guaranteed.

A solution provided in the state of the art is performing manual validations by software developers with the purpose of avoiding said vulnerabilities. The problem of this solution is not efficient and depends on the human factor; it would desirable an efficient and automatic solution.

Another solution comprises installing an application firewall performing the validation process automatically; one example of these types of solutions is the application firewall Appshield created in 1999. This firewall is a hardware solution (an appliance) located between the client and the server and processes all the requests from the client and all the responses from the server. The firewall parses all the responses and generates a cyphered text for each link and form. When the client request reaches the firewall, the application verifies whether the request is matches the data generated at the server. The problem is that the parsing process of server responses is not efficient and it would be desirable to have an efficient method to validate all the requests from the client. At the same time this kind of solutions are not easily integrable within development environments, since an additional hardware element is necessary in order to run the solutions. In consequence, is common to find integration problems when the application is deployed within production environments where the application firewall is present.

U.S. Pat. No. 8,510,827B1 relates to a method for taint tracking for security mechanism. The method "taints" the sensible information in terms of security, i.e. information that cannot be trusted and can modify the normal performance of the operating system. This method is oriented to the field of operating systems and virtualization systems. Therefore this method does not solve the lack of security in web services.

In the state of the art HDIV open-source project (hdiv.org) improves the performance offered by application firewalls because HDIV does not need to parse the response of web applications, reading all the information from memory within the applications. In other words, HDIV extends the behaviour of some web frameworks (Struts 1, Struts 2, JSF, Spring MVC, Grails) controlling the information flow of the data. On the other hand, HDIV does not implement some of the functionalities implemented by the firewalls, such as stopping DOS attacks or networks attacks. At the same time, HDIV may apply blacklist and whitelist validation patterns against editable data, but does not offer a solution to detect vulnerabilities within source code to avoid risks related with editable data such as SQL injection or XSS web risks.

The technical problem which is found in the state of the art is how to overcome the risks of the manipulation of applications from client side, preferably in HTTP, in an automatically and efficient way avoiding the need of modifying the source code of applications.

Although some of the state of the art solutions try to control the data flow between the server and the client, existing solutions are not optimum in the implementation strategy, as it is explained herein below.

Existing information flow control systems between server and client based on application firewalls, which in the present description is referred to as external implementation strategy, generate an excessive overload or performance overhead since the parsing is carried out on the HTML code coming from the server. At the same time existing JVM (Java Virtual Machine) internal data flow control systems based on compiled code transformation technique, in some cases known as instrumentation, such as HP Fortify or Contrast security products, monitors and control all the input data coming from web browsers at client's side, generating an extra work due to the monitoring of the whole set of received data.

There is a need for a more efficient data flow control system controlling and understanding the information generated originally at the server.

STATEMENT OF THE INVENTION

The present invention provides a solution for the aforementioned problem by a method for detection of manipulation of data by a client that performs a request to a server according to claim 1, a system according to claim 9 and an application according to claim 13. The dependent claims define preferred embodiments of the invention. All the features described in this specification (including the claims, description and drawings) and/or all the steps of the described method can be combined in any combination, with the exception of combinations of such mutually exclusive features and/or steps.

In a first aspect of the invention there is provided a method for detection of manipulation of data by a client that performs a request to a server and detection of vulnerabilities within source code, implemented on a system that comprises:
- at least one client adapted to
  - running requests to a server, comprising editable data and non-editable data, preferably editable data from text boxes or HTTP headers, preferably said requests are represented by data
  - receiving responses comprising editable and non-editable data from the server, preferably over the Hypertext Transfer Protocol (HTTP),
- at least a server adapted to
  - receiving said request from the client, and
  - sending said responses to the client, where the method comprises the following steps:
a. receiving, by either the server or an external entity, such as a firewall, a request from a client, if the request is an initial request go to step c),
b. if the request is a non-initial request,
   - reading, by either the server or an external entity, such as a firewall, the request identifier from the received request,
   - detecting manipulation, by either the server or an external entity, such as a firewall, and finishing the method if the request identifier (STATE_ID) is different to the request identifier (STATE_ID) of a previous request that has been added to a data structure (STATE) created for each risk point of a response of a previous request in the same session, wherein a risk point is preferably predetermined resources or link or form, preferably comprising parameters,
   - detecting manipulation, by either the server or an external entity, such as a firewall, and finishing the method if the content received in the request is different to the content of the data structure (STATE) corresponding to the received request identifier (STATE_ID),
   - detecting manipulation, by either the server or an external entity, such as a firewall, and finishing the method if there is some additional parameter not included within an existing STATE,
   - if the request comprises at least an editable parameter which has been edited or completed by the client, storing by the server the representation of the data comprised in these fields on the server in a second type of data structure (TaintedObjects),
c. generating the response by the server, preferably a HTML page,
d. analysing, by server, if during the generation of the response, at least one risk point is generated, preferably URLs or link or forms,
e. if there is at least one risk point in the response,
   - creating, by the server, a data structure (STATE) for each risk point, preferably resources, URLs or link or forms,
   - creating and associating, by the server, a request identifier (STATE_ID) to the data structure (STATE),
   - if the risk point comprises at least one parameter, identifying the typology, editable or non-editable, of the at least one parameter of the risk point, preferably the non-editable typology comprises one of a check box, radio button, select and editable typology comprises one of an editable field textbox or text area,
f. performing a predetermined action if the request comprises at least one editable parameter comprising content which is used during the generation of the response by the server, preferably in SQL queries or output writes improperly programmed known as sink point and sending, from the server, the response to the client or to an external entity,
g. receiving the response susceptible to be modified, by the client,
h. continuing in step a) if the client sends another request to the server in a same session, preferably using one of the request identifiers (STATE_ID) generated in the step e) of the current request, or a previous request inside the same session.

The method defined in the present description is considered as a global information flow control method, since, applied on a system comprising a server and a client, the data are controlled ever since data, for example web pages, are rendered at the server and until said data are received back at the server side from a new request from the client. The global information flow control method is defined in the present invention and is carried out by implementing steps "a" to "g" referred to above.

The firewalls are referred to, in the present description, as application firewall or web firewall in a wide sense, being suitable for any kind of application level protocol ($7^{th}$ OSI layer), preferably HTTP protocol.

Said method is carried out applying at least one of known techniques adding an additional behaviour to a server or firewall, said behaviour being used for controlling the data flow globally within applications running on servers, but without amending original source code of said applications. These known techniques are:
- Compiled code transformation: this technique can be applied on runtime or in build process of the applications. Specifically the compiled product (for instance .class file in Java EE platform or .il files in .NET platform) is transformed to add the extra behaviour. In the build process transformation, the compiled code is transformed before the deployment of the application into the server. In other words, the deployment product (in Java environments .war, or .ear files) is already transformed before the deployment into the server. In the runtime case, the transformation is implemented when the compiled code is loaded in the memory of the server by the server. One implementation strategy for runtime transformation in Java environments is implementing through Java Instrumentation API.
- APIs extension: this technique replaces the default implementation of an API or Interface used by an application running on a server (for instance Java, .NET, PHP platforms APIs, utilities libraries APIs, etc.) by other implementation provided by the invention. In order to change the implementation it is necessary to update the configuration files of the application, preferable XML files, but it is not necessary to update source code files of the application.
- Additional code: especially in web environments such as (PHP, Java EE, .net) it is possible to add additional code that is executed before a request from a client is processed by a server application. This additional code or software component is known as "web filters" and allows adding an extra behaviour in a web request processing process without updating or amending the source code of the applications. An example of this software component is javax.servlet.filter. The web filter is applied within the application running on the server. In other non web environments this kind of extra behaviour may be applied using aspects (Aspect Oriented Programming) or similar software components.

The risk points are referred to, in the present description, as the whole information contained in a link or form, as well as in other objects, such as resources, URL, parameters names, parameters values, and the like. Risk points may comprise editable or non-editable parameters. For example, risk points of the type "form", may comprise editable parameters.

The method according to the invention is carried out starting from step "a" for an initial request. The server generates the response data which is requested by the client. When processing the request, the server can "find" a risk point.

At the request processing phase, for every risk point, both comprising editable parameters and non-editable parameters, a type of data structure is created, which in the present description is referred to as "STATE". A STATE comprises:

A string type variable for storing resources or identifiers, or preferably URL,

A string type variable for storing the state identifier, or also referred to as STATE_ID, A map for storing parameter's names (the key of the map), and the values of the parameters (the value of the key within the map). The values are represented as an array.

A map for storing the types of parameters such as textbox, checkbox, radio button, text area, hidden, select (the key is the parameter name and the value the type of parameter).

A STATE allows storing the content of the risk points and storing identifiers, in the present description referred to as STATE_ID, representing identification for each risk point. For a link, the STATE specifically may comprise the URL and parameter's names and values. For a form, a STATE may comprise: URL, parameter types, parameters names and parameters values.

The following step is: sending the initial data requested to the client.

For every request from the client the step referred to as "validation" is carried out. This is defined, in the steps of a method according to the invention in step "b" wherein validation comprises detecting manipulation if one of the options defined is verified; for this tasks, a comparison between the content of the STATE comprising the identifier (STATE_ID) and the content of the STATE corresponding to the incoming identifier (STATE_ID) is performed. In the case of the non-editable parameters or non-editable data, the comparison or validation is used in a manner such that the content the server sends to the client is stored and compared with the content of the corresponding object or field in the following request the client performs in a same session. This mechanism allows detecting a manipulation if a change in the content is noticed. Validation can be performed either in the server or in an external entity, such as an application firewall. In the last case, the STATE may be sent towards the firewall in the response from the server. Advantageously including the STATEs in a response allows having a better response time in the case where a firewall is used, since the tasks of structuring the data into data objects such as a STATE by the server allows the firewall to save time in parsing the response from the server, and thus only validating the information or data comprised in the STATE.

If the client sends a new request (non-initial) within the same session to the server, the step "b" is carried out.

In the present invention, if editable parameters or editable data are detected within the incoming request, step "b" comprises creating a second type of data structure, referred to as TaintedObject(s). TaintedObjects are adapted, at the receiving phase, to store the received parameter's value of the type "editable", preferably being editable text boxes or text areas. TaintedObjects are characterised in that they comprise an array for pointers pointing at a memory location, where the value, name and identifier of the editable data are stored, wherein memory is understood as internal or external memory or a combination of both.

TaintedObjects allow storing the content coming from editable data included within the request. The typology of the pointers or objects stored in this data structure are preferably text types; for example within Java programming language, String, StringBuffer, StringBuilder, CharArray.

As a way of explaining example, for a non-initial request, for step "a" if the user sends a POST request including five parameters and one of them comes from editable data (param1), then in step "b" the TaintedObjects structure is created which comprises said object:

TaintedObjects={param1}, where param1 in an embodiment is accountNumber.

If any new TaintedObject is created or derived from the above TaintedObject list, it is included within this list. For example, if the server creates a new String from a previous tainted string, the "newString" is included within the previous list of parameters, as the example below:

String SQL="select . . . "+accountNumber;

TaintedObjects={accountNumber,SQL}

The above explained technique is referred to, in the present description, as propagation.

In the state of the art, all the information coming from the client is treated as TaintedObjects in the examples above explained. In the present invention, this technique is applied only in the editable parameters or editable objects or data stored in TaintedObjects and the objects derived from said TaintedObjects. This is possible in the present invention due to a global information flow control method.

In the case that no manipulation is detected, but a TaintedObject is used in some sink point during request processing, the method allows performing a predetermined action, which in a particular embodiment is to create an alert reporting, in an embodiment, the file and line number of the sink point in case this is in the form of programming code, or aborting the loading of the data, or performing proactive actions, preferably escape the string or executing secure functions.

By applying the use of TaintedObjects to editable parameters or data, which is equivalent in the present invention to apply monitoring of data only on editable data, advantageously the efficiency is increased since the technique, in comparison to the state of the art, is not applied to the whole set of received data.

Therefore, advantageously this method:
avoids the lack security of the when a communication between a server and a client is susceptible of being modified, the method extracts the necessary information to identify automatically and efficiently the risk points, both editable and non-editable data, of a request sent by the client to a server, and increases the efficiency of the data flow control method at the server, by monitoring the data coming only from editable parameters comprised in forms.

The method guarantees the integrity of the received request automatically and efficiently.

In an embodiment of a method according to the invention, if the request is received by an external entity (73), then the method further comprises before step c, a previous step of forwarding the request to the server, further, for each non-initial request from the client, forwarding by the external entity towards the server the editable parameters from the first type of data structure (STATE), in step f): sending, from the server to the external entity (73) all the data structures (STATE) created for the request along with the response, after step f): a following step of forwarding, by the external entity (73), the response to the client and storing, by the external entity (73), the STATES in the external entity (73).

Further, for each non-initial request from the client, forwarding by the external entity towards the server the editable parameters from the first type of data structure (STATE). This is performed in order to taint, by the server, the data coming from editable parameters or fields. In the case where the STATE does not comprise editable parameters, this is not performed.

In another embodiment of the method according the first aspect the STATES are organized, by the server, in a third type of data structure (SCREEN) and if the request is received by an external entity, then the STATES are sent to the external entity, in step f), organized in SCREENs so that the external entity stores the STATES in SCREENs.

In another embodiment of the method according the first aspect, in the step for storing all STATE generated for each risk point in a SCREEN, can be performed either in the internal memory of a server, or shared among the internal memory in the server plus one or more complementary servers, or in memory of an external entity.

Due to the screen data structure the STATES related with previous data, for example web pages or native screens within and Android native app viewed by a user in the same session, can be managed and stored together. This is especially useful to avoid an excessive memory consumption within the server, limiting the number of screens stored at server side and allowing to delete them, in an embodiment, when the maximum number of screens is reached (for instance 5 screens).

In an embodiment the step for creating, by the server, a data structure (STATE) further comprises, storing the content of the data structure (STATE) corresponding to each risk point in a storing space, preferably internal memory in the server, or storing the content of the data structure (STATE) corresponding to each risk point in the data which is sent to the client, and storing a hash value of said content in a storing space, preferably internal memory in the server, or cyphering the content of the data structure (STATE) corresponding to each risk point and storing said cyphered content in the data to be sent to the client.

Advantageously, this embodiment allows implementing bespoke solutions. For example, if there is not enough storing space on a server, the strategy of hashing can be used since less storing space is required.

In another embodiment of the method the step for reading the request identifier (STATE_ID) from the received request comprises:

checking the data structure (STATE) of the request identifier (STATE_ID) in a memory space, preferably the internal memory of the server, or generating a second hash of the content of the received data structure (STATE) of the data received in the request, or deciphering content of the data structure (STATE) corresponding to each risk point.

This embodiment provides a solution for how to recover de information of the request received in the server from the client. This is an advantage because it can recover the information from the request according to one of the previous alternatives for storing the content of the data structure.

In a particular embodiment the STATES are organized by the server in a third type of data structure or SCREEN and wherein, if the request is received by an external entity, then the STATES are sent to the external entity, in step f), organized in SCREENS and the external entity stores the STATES in SCREENS.

Advantageously this third type of data structure allows system scalability and it further allows organizing the STATE in, for example, one SCREEN per session. Also, the response time is reduced since the SCREENS are stored in the external entity and the information to validate is organized. The resources which were employed in the state of the art for seeking information to compare against the requests sent from client side in order to validate can be now employed in other tasks.

In an embodiment it is possible to store only the last screen within the server, and the other SCREENS (the oldest ones) within another external server. This advantageously allows reducing the memory consumption at the server side. The external server, for instance a memory Database such as Redis, may store big amounts of data in memory, without the performance overhead generated commonly within JVM and .NET "Common Language Runtime" environments due to garbage collection tasks.

In an embodiment it is possible to store only the last screen within the JVM or .NET memory and the rest of screens within the server but outside the memory controlled by execution environments garbage collector. This technique is known as off-heap memory storage.

Advantageously as a difference with the state of the art, this embodiment provides a solution for increasing the capacity of the server adding a new complementary server.

Advantageously as a difference with the state the art, this embodiment provides an integration and collaboration between external entities, such as application firewalls, and the server side applications where the invention is applied. In other words, the information required by the firewall (the SCREEN data structure) is sent to the application firewall avoiding the overhead of response parsing. Thanks to this information (SCREEN data structure) the firewall can implement validation tasks as well as additional security functionalities implemented by this kind of products (DOS attacks, load balancing, etc.). This is an advantage over HDIV open-source solution because the global security solution is better that the independent solutions (application firewall and HDIV independently).

In an embodiment, the method is applied to detect manipulation of web pages by a web client that performs a web request to a web server and detection of vulnerabilities within source code, implemented on a system that comprises:
- at least one web client,
- at least a web server adapted to
- a telecommunication network in connection to the web client and the web, through which the request and the web response are sent, where the method comprises the following steps:
a) receiving, by either the web server or an external entity, a web request from a web client, if the web request is an initial web request go to step c),
b) if the web request is a non-initial web request,
reading, by either the web server or an external entity, such as a firewall, the request identifier (STATE_ID) from the received request represented by a string (STR),
detecting manipulation, by either the web server or an external entity, such as a firewall, and finishing the method if the request identifier (STATE_ID) is different to the request identifier (STATE_ID) of a previous request that has been added to a data structure (STATE) created for each risk point of a web page of a previous request in the same web session, wherein a risk point is preferably a predetermined link or web form, preferably comprising parameters,
detecting manipulation by either the web server or an external entity, such as a firewall, and finishing the method if the content received in the request is different to the content of the data structure (STATE) corresponding to the received request identifier (STATE_ID),
if the request comprises at least an editable parameter which has been edited or completed by the client, storing (36) the representation of the data comprised in these fields on the web server, in a second type of data structure (TaintedObjects),
c) generating the web response by the web server, preferably a HTML page,
d) analysing, by web server, if during the generation of the response, at least one risk point is generated, preferably link or web forms,
e) if there is at least one risk point in the response,
creating, by the web server, a data structure (STATE) for each risk point, preferably link or web forms,
generating and associating, by the web server, a request identifier (STATE_ID) to the data structure (STATE),
if the risk point comprises at least one parameter, identifying the typology, editable or non-editable, of the at least one parameter of the risk point, preferably the non-editable typology comprises one of a check box, radio button, select and editable typology comprises one of an editable field textbox or text area,
f) performing a predetermined action if the request comprises at least one editable parameter comprising content which is used during the generation of the response by the server, preferably in SQL queries or output writes improperly programmed known as sink point and sending, from the web server, the web page to the web client or to an external entity,
g) receiving, from the web client, the web page susceptible to be modified by the web client or by an external entity,
h) continuing in step a) if the web client sends another web request to the web server in a same session web, preferably using one of the request identifiers (STATE_ID) generated in the step e) of the current request, or a previous request inside the same web session.

In a second aspect of the invention there is provided a system comprising
a server adapted to perform the method steps of a method according to the first aspect when they are referred to a server,
a client in communication to the server through a telecommunications network adapted to perform the method steps of a method according to the first aspect when they are referred to a client.

In the present description "server" is understood as a hardware element where the server side of applications are hosted.

In an embodiment the server is a web server and the client is a web client, whereas the responses generated by the web server are web pages and the requests sent by the web client are web requests. In this embodiment, the web server may be one of APACHE, IIS, or application server, such as TOMCAT, WEBSPHERE, in such manner that the method of the first aspect of the invention may be implemented in any programming environment comprising either servers—such as in APACHE—, or application servers—such as in JAVA—. In general terms, a server is the device or machine where a web application is hosted, independently of the environment it is implemented on.

For example, in environments such as MICROSOFT or PHP, "server" may be interpreted as server (APACHE, IIS), and in environments such as JAVA, "server" would be interpreted as application server (TOMCAT).

In a third aspect of the invention there is provided an application for detection of manipulation of applications by a client that performs a request to a server and detection of vulnerabilities within source code, the application adapted to run on a server and comprising:
means for analysing whether at least one risk point is generated during the generation of the response,
means for creating a data structure (STATE) for each risk point,
means for associating, a request identifier (STATE_ID) to the data structure (STATE),
means for checking whether the risk point comprises at least one parameter,
means for identifying the typology of the at least one parameter of the risk point
means for reading the request identifier (STATE_ID) from the received request preferably represented by a string (STR),
means for detecting manipulation and for rejecting the request if the request identifier (STATE_ID) is different to the request identifier (STATE_ID) of a previous request that has been added to a data structure (STATE) created for each risk point of a response of a previous request in the same session,
means for detecting manipulation and for rejecting the request if the content received in the request is different to the content of the data structure (STATE) corresponding to the received request identifier (STATE_ID),
means for storing the representation of the editable data comprised in the request and received by the server in a second type of data structure (TaintedObjects), In an embodiment, the application further comprises:

means for performing a predetermined action if at least some data included in the second type of data structure (TaintedObject) is used in a sink point during the generation of the response by the server or means for using functions included within libraries in the application or solutions or functions available within the server.

As a difference with the state of the art, this application also allows proactive actions in runtime; for example, allows escaping a TaintedObject used by the code in runtime, and also allows that the code for performing such actions is embedded in the server in libraries.

Advantageously, an application according to this embodiment detects when a TaintedObject is used in a sink point, for example SQL queries or writes generating a response output improperly programmed, As a difference with the state of the art, the application and method create an alert for the server and/or performs proactive actions, preserving the security in the server.

In an embodiment of the application, it is adapted to perform the relevant steps of any one of the particular embodiments of the first aspect of the invention.

The security solutions in the state of the art mainly consider the entire client requests to be suspicious of being dangerous for the server, and thus the solutions of the state of the art tend to analyse the whole request. This invention, instead, once has analysed the integrity of non-editable data, only controls or monitors editable data within the request processing, because it is possible to trust the rest of the data due to the integrity checks implemented previously. This fact advantageously saves resources such as memory or CPU consumption.

All the features described in this specification (including the claims, description and drawings and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

FIG. 1A This figure represents an embodiment of the architecture on which a method according to the state of the art is implemented.

FIG. 1B This figure represents an embodiment of the architecture on which a method according to the invention is implemented showing a client (15) and a server (17).

DETAILED DESCRIPTION OF THE INVENTION

Once the object of the invention has been outlined, specific non-limitative embodiments are described hereinafter.

Figure 4:
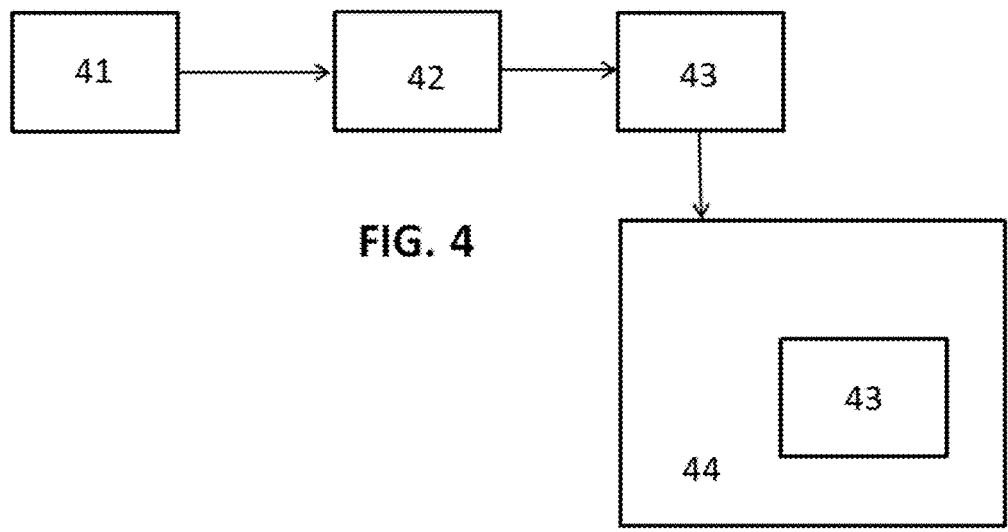
FIG. 4 This figure shows a flow diagram of an embodiment of a method according to the invention which uses a build process technique for being implemented on a server.
Figure 5:
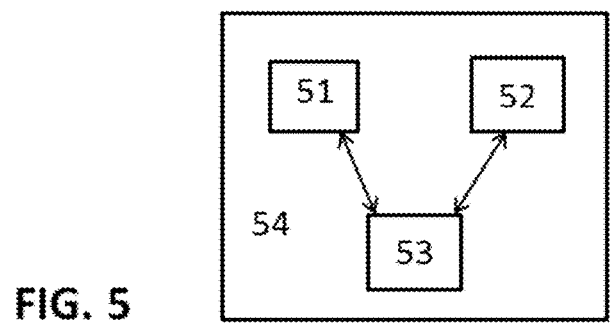
FIG. 5 This figure shows a flow diagram of an embodiment of a method according to the invention which uses a runtime technique for being implemented on a server.

The method according to the invention is carried out applying known techniques in order to add an additional behaviour to the server behaviour which is used for controlling the data flow globally within, for example, web applications running on servers, but without amending original source code of said applications. In an embodiment, the method is applied performing compiled code transformation:

Compiled code transformation: this technique can be applied on build process of the applications or in runtime. An example of such processes is represented in FIG. 4 for build process and in FIG. 5 for runtime process. Specifically the compiled product (41) or server application, for instance .class files in Java EE platform or .il files in .NET platform, are transformed to add the extra behaviour, and thus resulting in an amended version (43) of the server application. In the build process transformation (42), the compiled code is transformed before the deployment of the application into the server (44). In other words, the deployment product (43), for instance .war, or .ear files in Java environments, is already transformed before the deployment into the server (44).

As a way of an example, there is shown, in FIG. 1A, an embodiment of the architecture on which a method according to the state of the art may be implemented. In this case the client (11) exchanges (14) requests and responses with the server (13) in a web environment.

To avoid the weakness of the Hypertext Transfer Protocol (HTTP), a firewall (12) is used in the state of the art, which first of all parses the HTML response and afterwards uses the extracted information in order to validate the incoming requests.

In FIG. 1B there is an embodiment representing an embodiment of the architecture in which a method according to the invention may be implemented. The client (15) exchanges (16) requests and responses with the server (17) adapted to implement a method according to the invention. In this embodiment, the method is implemented as an application or subroutine (18) on the server (17) detecting manipulation of web requests received.

Figure 2A:
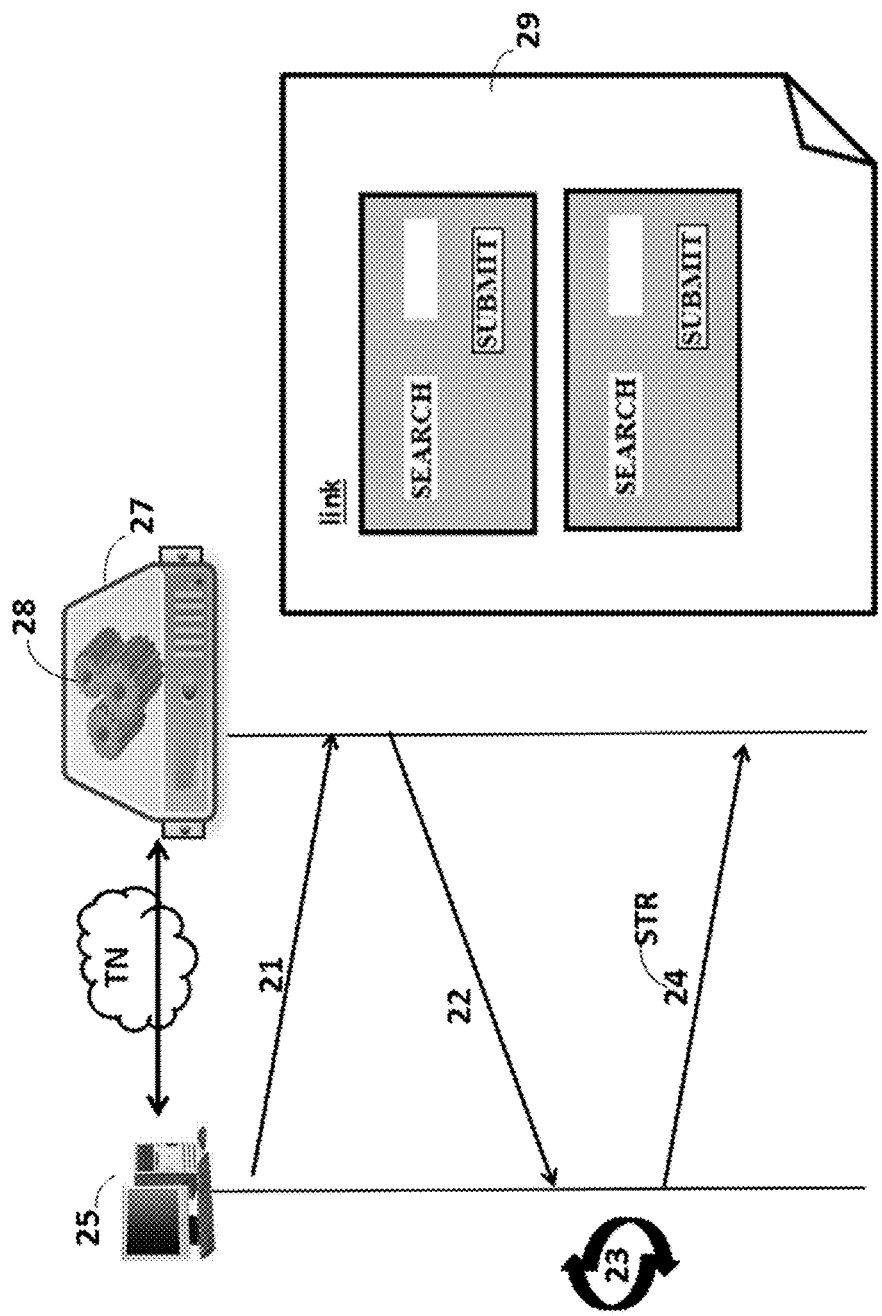
FIG. 2A This figure shows an example of method steps implemented according to the invention, where a client (25), a server (27) and a web page (29) are represented.

As a way of an example, an embodiment of the invention is shown in FIG. 2A, representing the method (28) steps implemented on the architecture described previously. The client (25) requests an initial web request (21) to the server (27). For example the client (25) requests "http://web.com" (21).

Figure 2B:
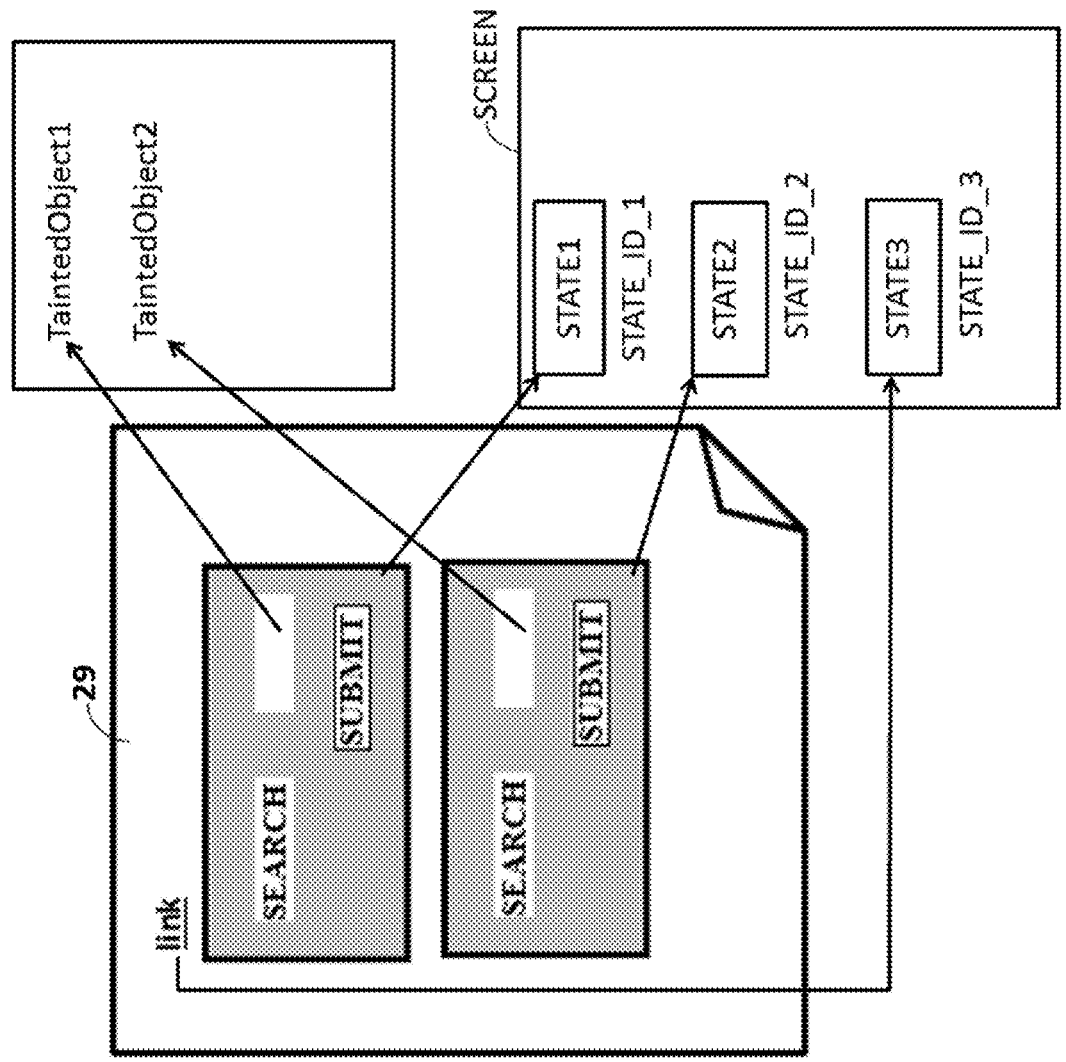
FIG. 2B This figure shows an example of method steps implemented according to the invention, where a first type of data structure (STATE), a second type of data structure (TaintedObject) and a third type of data structure (SCREEN) are represented next to a web page (29).

In this case the server (27), where the method (28) is implemented, analyses whether the request (21) is an initial request. In this embodiment since the request (21) is an initial request, the server (27) loads the web page (29) and checks whether there are any risk points. The server (27) creates a first type of data structure (STATE) for each risk point, as it is represented in FIG. 2B. Subsequently the server (27) associates a request identifier (STATE_ID) to the first type of data structure (STATE). In FIG. 2B a representation of three first types of data structures (STATE) is shown, first for a link, second for a form, and third for a different form. Besides, for each editable field, in this case the two text boxes, a second type of data structure is created (TaintedObject).

In this embodiment, the first types of data structures (STATE) are stored in a third type of data structure (SCREEN).

As the method steps in FIG. 2A show, the server (27), after creating the data structures (STATE) for each risk point and storing them in internal memory, allows associating an identifier (STATE_ID) for each risk point. The association is made by the web server, by modifying the response or web page, preferably adding an additional parameter to each link or URL and to each form; After associating the identifier (STATE_ID) to each risk point, the method allows sending (22) the web page (29) to the client (25), which comprises, as explained, an associated identifier (STATE_ID) for each risk point; this is represented in FIG. 23.

The client modifies (23) the link with malware or the text boxes are edited with SQL queries in order to obtain a malicious behaviour.

The client (25) sends a new request (24) comprising one of the state and states_id (STATE_ID_1, STATE_ID_2, STATE_ID_3) for each risk point shown in FIG. 23 to the server in the same web session; the server (27) reads the new request (24) which is sent in a form of a string (STR); the server (27) checks:

if the received State identifier (STATE_ID) is the same as any of the previous identifiers (STATE_ID_1, STATE_ID_2, STATE_ID_3) created for previous requests stored in the server, and If the content of the request is the same as the content stored in the corresponding first type of structures (STATE1, STATE2, STATE3), For the editable fields, or text boxes, the server checks whether the text field data is used in an unsuitable way, for example with an unsuitable programming code, or malware programming code, known as sink points, for instance a SQL query without parameterized queries or a write without escaping the data.

For example, if the URL of the link included in the web page (29) is http://servercom?accountId=10&STATE_ID=3, the user may change the value of the parameter accountId, for instance accountId=10, in order to try to watch the account data from another user.

Thanks to the extra parameter added by the method to each link and form, in that case STATE_ID=3, it is possible to read at server side the STATE related to this link and implement the validation process using this information. In that case, the request is rejected due to the fact that the value is different from the original value.

In this embodiment, since the client (25) has manipulated the link, the loading of the web page (29) is aborted and the session ends.

If the user submit one of the web forms included in the web page (29), and the value that come from the text field is used in a sink point, the application (28) on the server (27) performs a predetermined action before the execution of the sink point, which in this embodiment is to create an alert and implement a proactive action to solve the risk such as escape the data or use a secure function instead of the original function.

In an embodiment in which there is not manipulation, the server (27) accepts the request (24) and continues processing the request (29) requested by the client (25).

Figure 3:
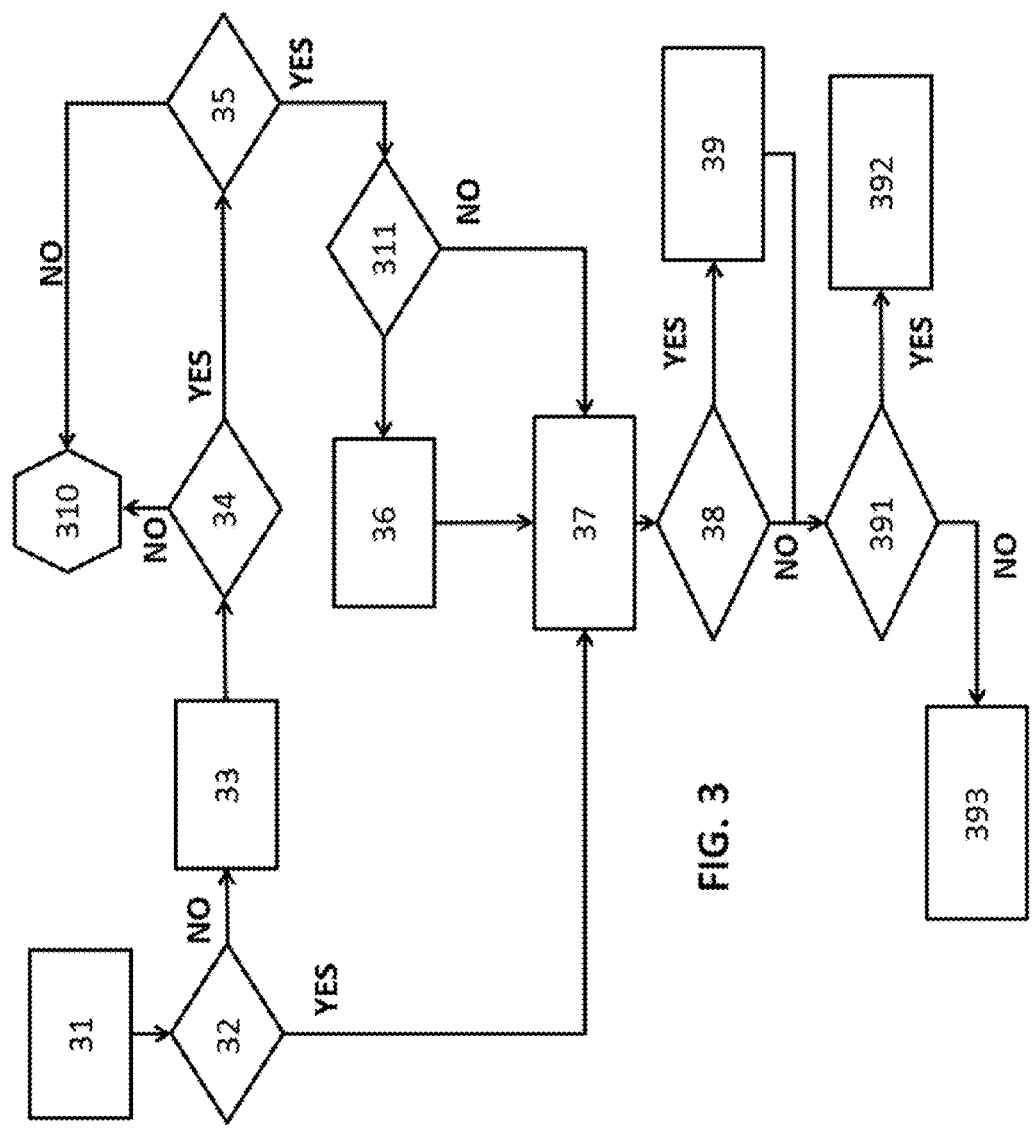
FIG. 3 This figure shows a flow diagram of an embodiment of a method according to the invention.

As a way of an example, there is shown, in FIG. 3, a flow diagram of an embodiment of the method. In a first step a server, receives (31) a request from a client. The server checks (32) if it is an initial request, preferably searching within a predefined list or URLs defined at the server side.

Case One: Initial Request:

The server receives (31) a request from the client which is an initial request.

The server starts generating the response (37), and analyses (38) if the response contains any risk point, in which case the server generates (39) a first data structure, or STATE, for each risk point. In order to detect the risk point the invention intercepts or extends the functions or subroutines used by the web framework or library to create links or forms. The source code is not changed or amended or updated because the extension is applied through configuration (XML or annotations) and not through updating source code.

Subsequently, the method allows the server to check (391) whether any sink point is used, i.e., if an editable parameter or TaintedObject is used as input parameter of a sink point, a predetermined action is performed (392). The server sends (393) the response to the client.

The client receives the response.

If the client does not make any other request the session expires.

If the client makes another request the process is executed again, with a non-initial request, as follows.

Case Two: The Request is Not an Initial Request:

The server receives (31) a request which is not an initial web request. The server reads (33) the web request received, and detects (34) if there is a parameter with the name STATE_ID which is the identifier of the request. If there is not a parameter named STATE_ID the request is rejected and the method ends (310). Otherwise the server reads the STATE data structure generated on a previous request, and analyses or validates (35) whether the non-editable parameters are the same as the values include within the corresponding STATE data structure, in order to determine that manipulation has not existed; in case of manipulation of any non-editable parameter, then manipulation is detected. Also, if there is some additional parameter not included within a STATE data structure, the request is rejected.

If the validation is overcome, then it is checked (311) whether there is any editable parameter included within the request; in case that there are any editable parameters comprising some content, this content is stored (36) within TaintedObjects data structure.

The server generates or renders (37) the response, and the method continues analysing (38) if the response contains any risk point, in which case the server generates (39) a first data structure, or STATE, for each risk point.

Figure 6:
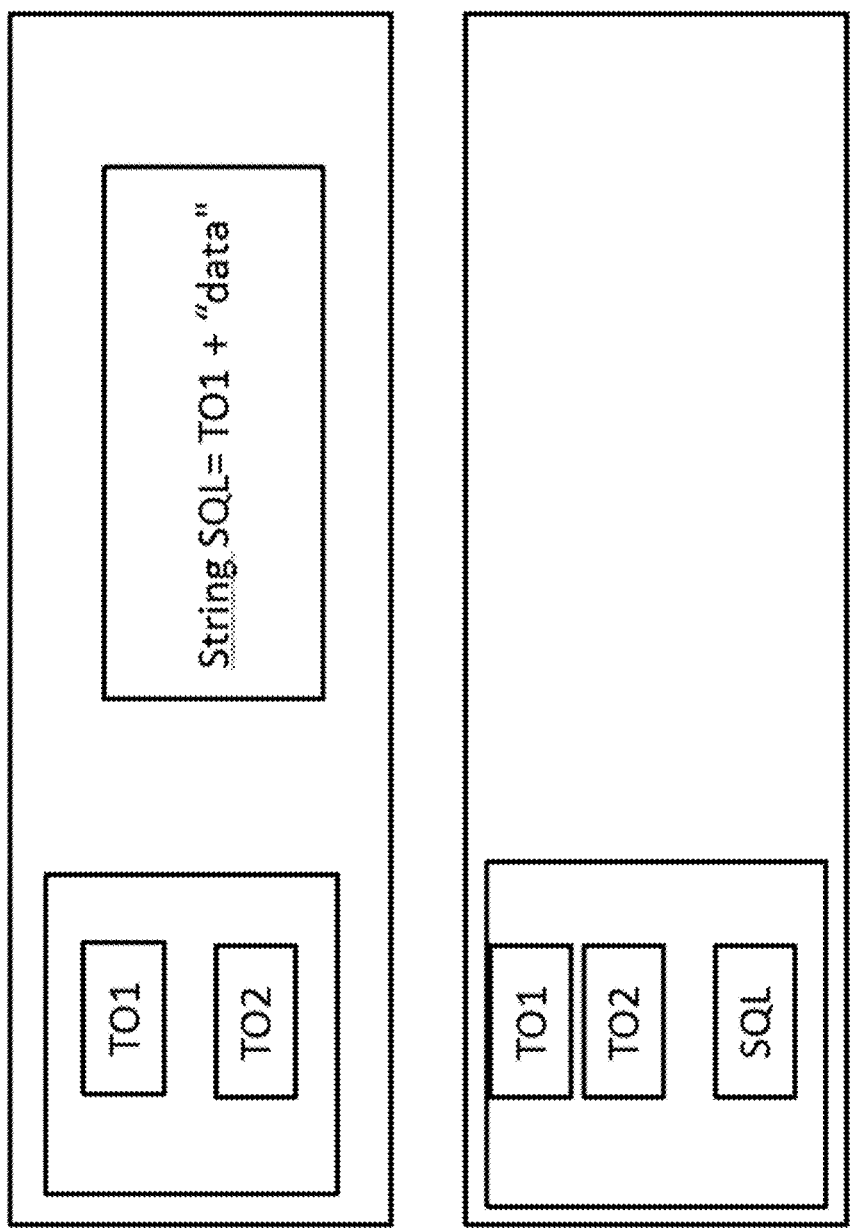
FIG. 6 This figure shows an exemplary scheme for illustrating the technic of propagation.

If the is any point where the server generates any new content derived from the contents stores within TaintedObjects data structure, the generated content is stored (36) within TaintedObject data structure as well. This process is known as propagation. This propagation is performed thanks to the transformation of compiled classes. This transformation is performed in load time, in runtime or in the build process. An example of propagation can be seen in FIG. 6, where starting from having two TaintedObjects, in the FIG. 6 represented by the name of TO1 and TO2, a new object is created by adding "data" to one of them, which is represented by the name SQL, this, a new Tainted Object represented in the figure by SQL is created.

In this specification, overload or performance overhead or overhead is any combination of excess or indirect computation time, memory, bandwidth, or other resources that are required to attain a particular goal.

Subsequently, the method allows the server to check (391) whether any TaintedObject is used as input parameters in a sink point.

Examples of these sink points functions are:

Database access in Java environments where there is the risk related with SQL Injection attacks:

```
public java.sql.Statement.execute*(String);
public java.sql.PreparedStatement.execute( );
```

Writes in the response where there is the risk related with XSS web risk:

```
javax.servlet.jsp.JspWriter.print(String);
javax.servlet.jsp.JspWriter.write(String)
```

If the use of any TaintedObject is detected (391) as input parameter of any sink function, the invention generates a log and a proactive action is performed (392) such as escaping the content in order to avoid XSS or SQL Injection attacks. In the example below there is in example of an escape function—(392) String escapedString=escapeFunction (String)—added by the invention before the sink point execution. In other words, the invention does not execute the sink point until it has analysed input parameters and executed some proactive action (392). Subsequently the sink point is executed in the same way as original source code.

```
(392) String escapedString= escapeFunction(String);
(391) Statement.execute(escapedString);
```

Note that this extra behaviour is added within compiled classes and the server application or the application source code remains the same.

If there is any risk point within the response (link or form renderization) the invention intercepts all the server functions that process this kind of components. The functions intercepted by the invention depend on the technology used by the server.

Some examples of this type of functions using two of the most used technologies (Java, .NET) are shown below:

Java, for instance Spring MVC web framework:

```
<html> <body>
(38) <form:form method="post" modelAttribute="person">
    <form: input path="name">
</form>
    </html></body>
```

The text above (38) represents the functions that in this case the form generates. The invention intercepts these functions in order to obtain the data stores within STATE data structures (url, parameters names, parameters values, etc.)

.NET, for instance ASP MVC framework.

```
<html> <body>
(38) @using (Html.BeginForm))
```

```
{
    @Html.TextBoxFor(model =>model.Name)
}
```

In order to measure the performance overhead avoided by the invention the table below the shows the necessary time for the core operations of the TaintedObjects propagation and monitoring algorithm. Basically there are two types of operations:

Search: in every function that may use a TaintedObject is necessary to search within TaintedObject data structure to verify if the data is tainted or not. The invention intercepts any function within the program that uses as Input data String or character type parameters. The number of search operations is directly related to the number of functions that may use TaintedObjects (any programming language type that contains String type formats or similar, for instance in Java language: String, StringBuffer, StringBuilder, Char, etc.) Insert: if any of the input parameters used by a function is Tainted the resultant Objects must be included within TaintedObject Data Structure.

In the tables below the results obtained within a Java 7 Environment are presented.

| Search operations | Search time (ms) | Insert operations | Insert time (ms) | TOTAL overload/overhead |
|---|---|---|---|---|
| 500 | 0.2 ms | 250 | 0.1 ms | 0.3 ms |
| 1000 | 0.4 ms | 250 | 0.2 ms | 0.5 ms |

This overload is related with the core operations of the invention but there are also additional operations that add more overload time. An average overload around 0.5 ms per request may be considered.

The impact of this overload depends on the business model of the application. Within web environments in different technologies (Java, .NET, PHP), the fastest web response time in the state of the art is usually comprised in a range of 3 ms-8 ms. The overload avoided by the invention (0.5 ms per request) is between 16%-5% (0.5 ms is the 16% of 3 ms and the 5% of 8 ms) because the most important part of web request does not include any editable data.

In a request including editable data this percentage is lower considering that in most of the cases web pages comprise a low number of editable fields compared to the total amount of non-editable fields; this is to say, there is, in most of the cases, about a 10% of editable parameters over the total number of parameters/fields.

Regarding memory consumption generated by any possible TaintedObject propagation and monitoring system, the memory consumption is directly related with the number of TaintedObjects included within the data structure and the typology of this data. For instance in Java environments, the reference to an object uses about 4-8 bytes, depending on how many bits the operating system is based on, or the program (32 or 64 bytes). Besides, the data related with the origin of the TaintedObject data is stored (http parameter, for example, accountID, name or equivalent, etc.), thus consuming more memory space. TaintedObjects are created for a particular HTTP parameter, for example accountID; this is what is referred herein by "origin".

| Number of Tainted Objects | Tainted DataStructure | Size per item | TOTAL SIZE |
|---|---|---|---|
| 200 | 20 bytes | 6 bytes | 1.3 KB |
| 500 | 20 bytes | 6 | 3 KB |

The size per item is the memory consumption due to a single web request. A server receives commonly an average of 300 request per second, so the algorithm may generate a memory consumption of 300 KB-900 KB per second, or around 18 MB-54 MB per minute.

The invention reduces the memory consumption because, unlike the state of the art solutions which only consider tainted data, the data that come from editable fields. For instance in requests that don't include editable data (usually 80-90% of the web request because links doesn't have editable data) the invention don't use memory at all. In the rest of the requests (20-10%) the amount of consumed memory is lower due to the invention only monitor editable data.

Figure 7:
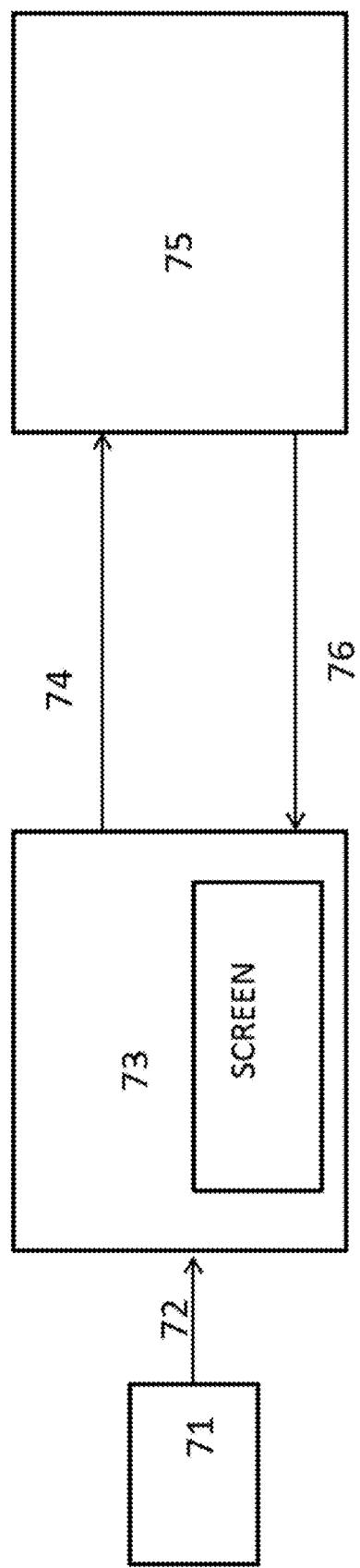
FIG. 7 This figure shows an exemplary embodiment where the method is performed on a system comprising a client (71), a server (75) and a firewall (73).

As a way of example, in FIG. 7 there is shown an scenario in which the data structures (STATE) are stored in SCREENS, said SCREENS being sent in the response towards an external entity (73), such as a firewall, and the firewall being the one performing the steps of the method corresponding to the validation of non-editable parameters, this is, some of the steps of step b of a method according to the invention.

This is an embodiment wherein the method, in the step for storing all STATE generated for each risk point in a SCREEN, is performed in memory of an external entity (73).

The scenario in FIG. 7 presents:
A client (71) sends a request (72) towards a server (75), the request being intercepted by the firewall (73),
The firewall (73) receives (31), a web request from the client (71), and forwards the request (74) towards the server (75), where other method steps are performed, namely:
creating, by the server (75), a STATE for each risk point,
associating, by the server (75), a STATE_ID to the STATE,
if the risk point comprises at least one parameter, identifying the typology, editable or non-editable, of the at least one parameter of the risk point, preferably the non-editable typology comprises one of a check box, radio button, select and editable typology comprises one of an editable field textbox or text area
performing a predetermined action (392) if the request comprises at least one editable parameter comprising content which is used (391) during the generation of the response by the server, preferably in SQL queries or writes known as sink point,
creating a SCREEN comprising the STATES created for the current session,
Subsequently the server (75) sends (76) the response together with the SCREEN created for the web session to the firewall (73),
The firewall (73) filters the SCREEN and the response. The response is sent towards the client (71) whereas the SCREEN is stored in the firewall. Advantageously, this method saves internal memory in the server (75) and improves the performance of the firewall avoiding the parsing process of the response,
receiving, from the client (71), the web page susceptible to be modified by the client (71),
restarting the process if the client (71) sends another web request to the server (75) in a same session web, preferably using a request identifiers (STATE_ID) generated in the step f) of the current request, or a previous request inside the same web session.

Subsequently, for every request within the same web session, the client (71) sends (72) requests which the firewall (73) intercepts. The firewall (73) then sends the request (74) together with the STATE or, in the case of the figure, the SCREEN which has been created for the current web session. As long as the same web session continues, the firewall (73) stores the SCREEN coming from the server (75), and checks whether the incoming requests must be rejected according to the comparison of the incoming identifiers with the STATE_ID comprised in the SCREEN.

The advantages of structuring the data in the structure SCREEN and sending it to the firewall (73) embedded in the response are:
response time is speeded up within the firewall, with respect to the state of the art where the firewall needs to parse and analyse the whole response generated at the server, preferably in HTML, XML, JSON formats, and
memory space within the server (75) is saved as neither STATE nor SCREENS need to be stored in the server (75).

Particular Example: Native Mobile Application:
In this particular example, the following steps are implemented:
A native mobile application, for instance an Android or IOS app (71), sends a request (72) towards a server (75), the request being intercepted by the firewall (73),
The firewall (73) receives (31), the request from the client (71), and forwards the request (74) towards the server (75), where other method steps are performed, namely:
creating, by the server (75), a data structure (STATE) for each risk point, preferably link or web forms,
associating, by the server (75), a request identifier (STATE_ID) to the data structure (STATE),
if the risk point comprises at least one parameter, identifying the typology of the at least one parameter of the risk point wherein the risk point is preferably a of non-editable field, more preferably a check box, radio button, select and an editable field textbox or text area
performing a predetermined action (392) if the request comprises at least one editable parameter comprising content which is used (391) during the generation of the response by the server, preferably in SQL queries or writes known as sink point,
creating a SCREEN comprising the STATES created for the current session.
Subsequently the server (75) sends (76) the response together with the SCREEN created for the session to the firewall (73),
The firewall (73) filters the SCREEN and the response. The response is sent towards the client (71) whereas the SCREEN is stored in the firewall. Advantageously, this method saves internal memory in the server (75) and improves the response time of the firewall avoiding the parsing time of the whole response,
receiving, from the client (71), the data susceptible to be modified by the client (71),
continuing the process if the client (71) sends another request to the server (75) in a same session, using one of the request identifiers (STATE_ID) generated previously in the current request, or a previous request inside the same session;

subsequently, for every non-initial request from the client the firewall (73) forwards towards the server (75) the editable parameters from the STATE, which are received in every request, in the case the request comprises editable parameters.

The invention claimed is:

1. A method for detecting a manipulation of data relating to an application hosted by a server and for detecting vulnerabilities within the application source code, the method comprising:
   a) receiving a request sent from a client to the server, and determining if the request is an initial request;
   b) when the request is determined in step a) to be an initial request, performing at the server the following steps:
      b1) generating a response to the request,
      b2) analysing the response to determine whether the response includes at least one risk point, and
      if there is at least one risk point in the response,
         creating, for each risk point, a first type of data structure,
         generating and associating a request identifier to the first type of data structure created for each risk point,
         determining if the risk point comprises at least one parameter, and identifying a typology, editable or non-editable, of the at least one parameter of the risk point,
      b3) performing a predetermined action if the request includes at least one editable parameter comprising content which is used during generation of the response by the server, the content being in a sink point and sending, from the server, the response to the client or to an external entity, and
      b4) continuing in step a) if the client sends another request to the server in a same session, using one of the request identifiers generated in the step b2) for the initial request, or a previous request received during the same session,
   c) when the request is determined in step a) to be a non-initial request, performing the following steps:
      c1) reading, at the server or at the external entity, the request identifier from the non-initial request,
      c2) determining, at the server or at the external entity, that a manipulation of data relating to the application has occurred and rejecting the non-initial request if the read request identifier is different from the request identifier from a previous request received during the same session,
      c3) determining, at the server or at the external entity, that a manipulation of data relating to the application has occurred and rejecting the non-initial request if content received in the non-initial request is different from content corresponding to the request identifier from a previous request received during the same session,
      c4) determining, at the server or at the external entity, that a manipulation of data relating to the application has occurred and rejecting the non-initial request if there is an additional parameter in the non-initial request that was not included within the data structure a previous request received during the same session,
      c5) if the non-initial request includes at least one editable parameter that has been edited or completed by the client, creating a second type of data structure for each editable parameter and storing in the second type of data structure at the server, a representation of the data contained in a field of the at least one editable parameter, wherein the second type of data structure is a tainted object and wherein each tainted object is store in a list,
      c6) generating a response to the request,
      c7) analysing the response to determine whether the response includes at least one risk point, and
      if there is at least one risk point in the response,
         creating, for each risk point, a first type of data structure,
         generating and associating a request identifier to the first type of data structure created for each risk point,
         determining if the risk point comprises at least one parameter, and identifying a typology, editable or non-editable, of the at least one parameter of the risk point,
      c8) performing a predetermined action if the request includes at least one editable parameter comprising content which is used during generation of the response by the server, the content being in a sink point and sending, from the server, the response to the client or to an external entity,
      b9) propagating the tainted objects such that new objects created or derived from the tainted objects are included in the stored list of tainted objects, and
      c10) continuing in step a) if the client sends another request to the server in a same session, using one of the request identifiers generated in the step b2) for the initial request, or a previous request received during the same session,
   the method being carried out by adding an additional behaviour to the server or the external entity using at least one of:
      Compiled code transformation,
      APIs extension, and
      Additional code.

2. The method according to claim 1 wherein if the request is received by the external entity, then the method further comprises
   forwarding the request to the server,
   for each non-initial request from the client, forwarding to the server the editable parameters from the first type of data structure,
   sending, from the server to the external entity all data structures created for the request along with the response,
   a following step of
      forwarding, by the external entity, the response to the client and
      storing, by the external entity, the data structures in the external entity.

3. The method according to claim 2 wherein the data structures are organized, by the server, in a third type of data structure and wherein if the request is received by an external entity, then the data structures are sent to the external entity, organized in screens, and the external entity stores the data structures in the screens.

4. The method according to claim 1, wherein creating, by the server, a data structure further comprises,
   storing the content of the data structure corresponding to each risk point in a storing space, or
   storing the content of the data structure corresponding to each risk point in the response which is sent to the client, or to the external entity, and storing a hash value of said content in a storing space, or cyphering the content of the data structure corresponding to each risk point and storing said cyphered content in the response to be sent to the client, or to the external entity.

5. The method according to claim 4, wherein reading the request identifiers from the received request comprises,
checking the data structure of the request identifier in a memory space, or
generating a second hash of the content of the received data structure of the web page received in the request, or
deciphering content of the data structure corresponding to each risk point.

6. The method according to claim 1, wherein performing a predetermined action if any representation of the data stored in the second type of data structure is used during the generation of the response by the server within a sink point, comprises at least one of the following actions,
creating an alert for the server, or
performing proactive actions.

7. The method according to claim 6, wherein performing proactive actions includes escaping the string or creating a new string.

8. The method according to claim 1, wherein the data are web pages, the client is a web client, the server is a web server, and the request is a web request sent from the web client to the web server.

9. A system comprising
a server adapted to perform the method steps of a method according to claim 1 when they are referred to a server,
a client in communication to the server through a telecommunications network adapted to perform the method steps according to claim 1 when they are referred to a client.

10. The system according to claim 9 which further comprises an external entity which is
located between the client and the server in such a manner that communication between server and client is intercepted by the external entity, and
adapted to perform the method steps when they are referred to an external entity.

11. The system according to claim 9 wherein the server is a web server and the client is a web client.

12. A server adapted to perform the method steps of a method according to claim 1 when they are referred to a server or to the external entity.

13. The method according to claim 1, wherein the editable data is data from text boxes or HTTP headers.

14. The method according to claim 1, wherein the responses received from the server are received over a Hypertext Transfer Protocol (HTTP).

15. The method according to claim 1, wherein the external entity is a firewall.

16. The method according to claim 1, wherein the non-editable typology comprises one of a check box, radio button, and select, and wherein the editable typology comprises one of an editable field textbox or text area.

17. The method according to claim 1, wherein the risk point includes at least one of predetermined resources, URL, link or form, and wherein the risk point includes parameters.

18. The method according to claim 1, wherein before receiving a request from the client, the method further includes a build process transformation wherein a compiled code is transformed before deployment of the application.

19. The method according to claim 18, wherein:
an input parameter of the request is in a string, and wherein the transformed compiled code includes a proactive action before a sink point executes and before propagation of a new tainted object is created during the request.

20. The method according to claim 19, wherein the proactive action is an escaping action executing secure functions and reporting an alert includes a file and line number of the sink point when in the form of programming code, or aborting the loading of the data.

21. A computer program product, stored on a non-transitory computer readable medium, the computer program product comprising program code for detecting a manipulation of data in a client-server application and detecting vulnerabilities within source code of the application, wherein the program code is executable by a processor and configured to:
analyze whether at least one risk point is generated during generation of a response to a request received from the client;
create a data structure for each risk point;
associate a request identifier to the data structure;
check whether the risk point comprises at least one parameter;
identify a typology of the at least one parameter of the risk point;
read within a server or an external entity the request identifier from the received request represented by a string;
determine, at the server or at the external entity, that a manipulation of data relating to the client-server application has occurred and reject the request if the request identifier is different from the request identifier of a previous request stored in a data structure created for each risk point of a response of a previous request in a same session;
determine, at the server or at the external entity, that a manipulation of data relating to the client-server application has occurred and reject the request if content received in the request is different from content of the data structure corresponding to the received request identifier; and
store in a second type of data structure a representation of editable data in the request and received by the server.

22. The computer program product according to claim 21 wherein the program code is further configured to perform a predetermined action if at least some data included in the second type of data structure is used in a sink point during the generation of the response by the server.

* * * * *